United States Patent [19]
Chambers

[11] Patent Number: 5,763,959
[45] Date of Patent: Jun. 9, 1998

[54] CONTROL CABINET FOR BUILDING AUTOMATION SYSTEMS

[76] Inventor: Michael Chambers, 10329 Hacienda St., Bellflower, Calif. 90706

[21] Appl. No.: 674,674

[22] Filed: Jul. 2, 1996

Related U.S. Application Data

[60] Provisional application No. 60/002,297 Aug. 14, 1995.
[51] Int. Cl.$^6$ ................................................ H02H 3/06
[52] U.S. Cl. ........................... 307/20; 307/38; 307/39; 307/140; 361/170; 361/192; 361/191
[58] Field of Search ....................... 307/11, 30, 31, 307/35, 38, 39, 42, 85, 86, 125, 126, 139, 140, 132 R, 132 E, 20; 361/166, 170, 189, 191, 192; 364/492, 707; 395/750; 340/638, 644, 652

[56] References Cited

U.S. PATENT DOCUMENTS

| | | | |
|---|---|---|---|
| 3,177,409 | 4/1965 | Kroes et al. | 361/192 |
| 3,359,426 | 12/1967 | Burr | 361/191 |
| 4,020,358 | 4/1977 | Wyland | 307/39 |
| 4,208,593 | 6/1980 | Sullivan | 307/35 |
| 4,236,084 | 11/1980 | Gingrass | 307/39 |
| 4,310,770 | 1/1982 | Keener et al. | 307/35 |
| 4,687,948 | 8/1987 | Helt | 307/38 |
| 4,710,841 | 12/1987 | Bottrell | 307/86 |
| 4,719,364 | 1/1988 | Pequet et al. | 307/132 E |
| 4,814,929 | 3/1989 | Ashley | 361/1 |
| 4,847,782 | 7/1989 | Brown, Jr. | 364/492 |
| 5,063,328 | 11/1991 | Walton | 315/96 |
| 5,214,311 | 5/1993 | Kageyama et al. | 307/43 |
| 5,225,994 | 7/1993 | Arinobu et al. | 364/492 |
| 5,436,510 | 7/1995 | Gilbert | 307/38 |
| 5,574,653 | 11/1996 | Coomer et al. | 364/492 |
| 5,615,105 | 3/1997 | Tofigh et al. | 307/31 |

*Primary Examiner*—Richard T. Elms
*Assistant Examiner*—Peter Ganjian
*Attorney, Agent, or Firm*—Larry K. Roberts

[57] ABSTRACT

A control cabinet for distributing power to a plurality of automated independent and parallel operated loads. A plurality of control cabinets can be interfaced with control cable to be supervised by one main controller. The main controller distributes low voltage ac signals to each control cabinet, which transfers the low voltage signal into high voltage power distribution by a series of low and high voltage relays, thus eliminating the need for excess circuit boards and transformers normally associated with this task.

12 Claims, 3 Drawing Sheets

CONTROL CABINET FOR BUILDING AUTOMATION SYSTEMS

This application claims the benefit of U.S. provisional application Ser. No. 60/002,297, filed Aug. 14, 1995, for ELECTRICAL CONTROL PANEL.

TECHNICAL FIELD OF THE INVENTION

This invention relates to a control cabinet that interfaces between a low voltage controller and line voltage power distribution panels.

BACKGROUND OF THE INVENTION

Most building automation systems use different types of low voltage controllers to operate their systems. All use a myriad of uniquely different electronic circuit boards, transformers, relays, contactors, and computer chips harnessed together to achieve their task. This has proven to be a helpful approach to conserving energy when the system is working properly, but the costs to supervise, maintain, trouble shoot and repair these sophisticated systems, particularly when installed in a facility which is not large enough to warrant the expense of a full time control technician, sometimes far outweighs the cost benefit of energy conservation.

It is an object of this invention to provide an alternate solution to the problem of energy management which is far easier to maintain and repair, by providing a control cabinet which converts low voltage signals to automatically control line voltage loads, such as lighting and HVAC (high voltage alternating current), in a simple, reliable and economical system.

SUMMARY OF THE INVENTION

In accordance with the invention, a control cabinet is provided with a series of differentiated (low voltage and line voltage) relays and rectifiers assembled together to facilitate the automated operability of line voltage loads. The control cabinet receives the low voltage control signal from a controller and, without the use of external contactors or transformers, transfers the low voltage control command to line voltage. A plurality of loads can be controlled independently or concurrently, by choice, from one cabinet. Multiple cabinets can be dispersed throughout a facility and operated by one controller, if desired.

In accordance with an aspect of the invention, a control cabinet for interfacing a circuit breaker panel to one or more line voltage loads under control of a low voltage controller comprises a cabinet housing, with a plurality of line voltage relay circuits secured within the housing, each for selectively electrically connecting a circuit breaker in the circuit breaker panel to a corresponding line voltage load. The cabinet includes a plurality of low voltage relays secured within the housing and responsive to a low voltage command signal received from the low voltage controller for actuating corresponding line voltage relays to selectively connect/disconnect one or more circuit breakers in the circuit breaker panel from its corresponding line voltage load. The control cabinet is free of any voltage transformers. Preferably, the low voltage command signals from the low voltage controller are low voltage alternating current command signals, and the low voltage relays each comprise a relay switch and a low voltage actuator responsive to the low voltage alternating current command signals to actuate the relay switch.

The control cabinet is intended to be used in a building energy management system for providing selective connection of the line voltage loads to a circuit breaker in the electrical distribution panel.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
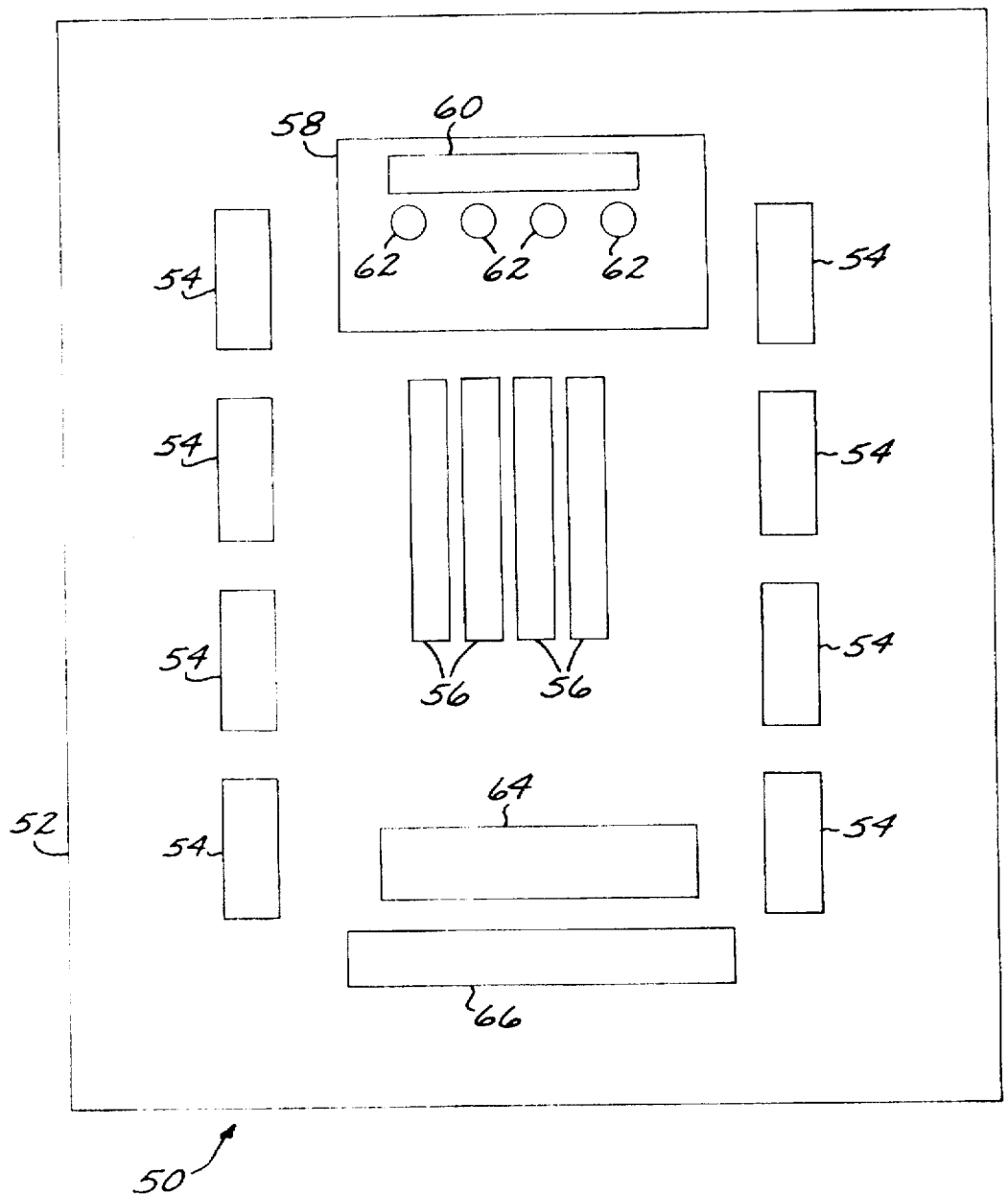
FIG. 1 is a simplified front view of an exemplary embodiment of a control cabinet embodying the invention, with its front cover removed.

FIG. 1 is a front view of an exemplary embodiment of a control cabinet 50 embodying the invention. The cabinet includes an enclosure housing 52 of conventional type; the door is removed, and not visible, in FIG. 1. An exemplary layout of the electrical components of the cabinet is illustrated. Two banks of line voltage relays 54 are disposed respectively along vertical sides of the housing. A bank of low voltage AC relays 56 is arranged between the banks of line voltage relays. Disposed above the low voltage relays is a transfer box 58 in which a low voltage common terminal bus 60 and LED indicator lights 62 are arranged. A line voltage terminal bus 64 and a neutral bus 66 are arranged below the bank of low voltage relays 56. The transfer box 58 separates low voltage elements from line voltage.

Figure 2:
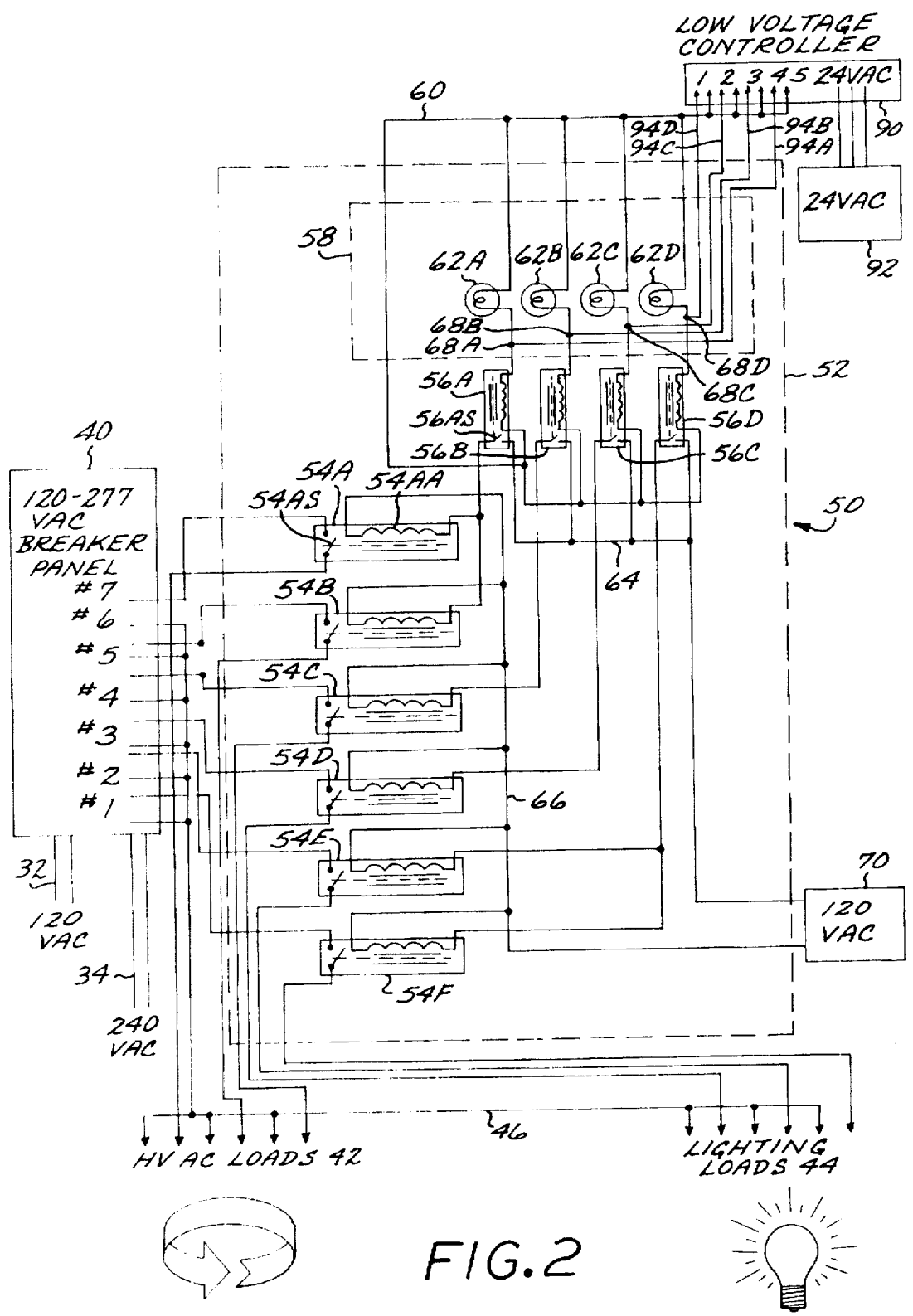
FIG. 2 is a schematic diagram of the control cabinet of FIG. 1, connected between a low voltage controller and a breaker panel.

FIG. 2 is a schematic diagram of the control cabinet 50, connected between a line voltage distribution (circuit breaker) panel 40 and a low voltage controller 90. The low voltage controller can be a commercially available unit, e.g. a model EC128 controller available from paragon Electric Company, Inc., 606 parkway Blvd, Two Rivers, Wis. Many other controllers will be suitable for the purpose. The controller 90 is powered by a 24 VAC transformer 92, and provides in this exemplary embodiment independently controllable 24 VAC control signals, which are connected to the control cabinet 50 by lines 94A–94D. A common line 94E is also connected from the controller 90 to the common terminal bus 60 in the cabinet via line 94E. As is well known in the art, the controller 90 serves the function of controlling the application of power to line voltage loads 42 and lighting loads 44.

The control lines 94A–94D are connected to terminals 68A–68D in the transfer box 58 within the cabinet 50. The respective terminals 68A–68D are in turn respectively connected to relay actuators comprising the low voltage relays 56A–56D. The terminals 68A–68D are also connected to the common bus 60 through respective ones of the red indicator LED light circuits 62A–62D, which are individually activated by an active control signal on lines 94A–94D. LED circuits suitable for the purpose are commercially available, e.g. the device marketed as the SOLICO 5SF circuit by Sorenson Lighted Controls, Inc., 75 Locust Street, Hartford, Conn. This exemplary LED light circuit incorporates a rectifier for noise suppression. The indicator lights 62A–62D provide a visual indication of the control signal status from the controller 90, and can be used for diagnostic purposes.

A line voltage supply 70 provides line voltage to the line voltage terminal bus 64, and a common connection to the neutral bus 66. The line voltage from supply 70 is used only for control purposes, and does not supply power to the loads 42 and 44.

The circuit breaker panel 40 is a conventional circuit breaker panel, connected to a source of line voltage, e.g. via lines 32 to a source of 120 VAC and/or via lines 34 to a source of 240 VAC. The panel 40 includes conventional protective circuit breakers, indicated in FIG. 2 as breaker nos. 1–7, for example, which trip if the current flow exceeds the maximum current permitted by the ampere rating of the breaker. Instead of wiring the loads directly to the panel 40, the control cabinet 50 interfaces the loads such as HVAC loads 42 and lighting loads 44 to the circuit breakers within the panel 40.

The low voltage relays 56A–56D include switches, controlled by the relay actuators, to selectively connect the line voltage terminal bus 64 connected to line voltage supply 70 to the actuator of a corresponding line voltage relay circuit 54A–54D. For example, relay 56A includes a switch 56AS which can be selectively closed/opened by actuator 56AA, depending on the state of the control signal on line 94A from the low voltage controller. Similarly, line voltage relay 54A includes an actuator 54AA controlled by relay 56A, and a switch 54AS which can be selectively opened/closed by the actuator 54AA. The line voltage relays 54A–54D are in turn connected between the line voltage terminals of corresponding circuit breakers in the breaker panel 40 and corresponding HVAC or lighting load circuits 42, 44, to control application of line voltage to the respective loads. Each circuit breaker of the panel 40 is also connected to the line voltage common bus 46.

A low voltage relay 56A–56D can be used to control more than one line voltage relay. This is illustrated in FIG. 2 by the connection of low voltage relay 56D to actuators of both line voltage relays 54E and 54F, which in turn are connected to respective ones of the lighting loads 44. Thus, in this exemplary embodiment, the five line voltage relays 54A–54E are connected to four load circuits, each load circuit controlled by a corresponding low voltage AC relay 56A–56D.

The low voltage relays 56A–56D are selectable for either the normally closed or normally open configurations, to allow for fail safe operations according to the requirements of particular applications. Low voltage AC relays suitable for the purpose are commercially available, e.g. the model P2R relay marketed by OMRON Electronics, Inc. One East Commuter Drive, Schaumburg, Ill. Line voltage relays suitable for the line voltage relays 54A–54E are also commercially available, e.g. the model G7L relay marketed by OMRON Electronics, Inc., modified with appropriate wire terminations and torque ratings for UL approval.

The control cabinet 50 is interfaced between the loads 42, 44 and the circuit breaker panel 40, and thus is protected against circuit malfunctions by the circuit breakers of the panel. Moreover, no wiring changes between the line voltage source and the breaker panel 40 are required to install the control cabinet 50.

Figure 3:
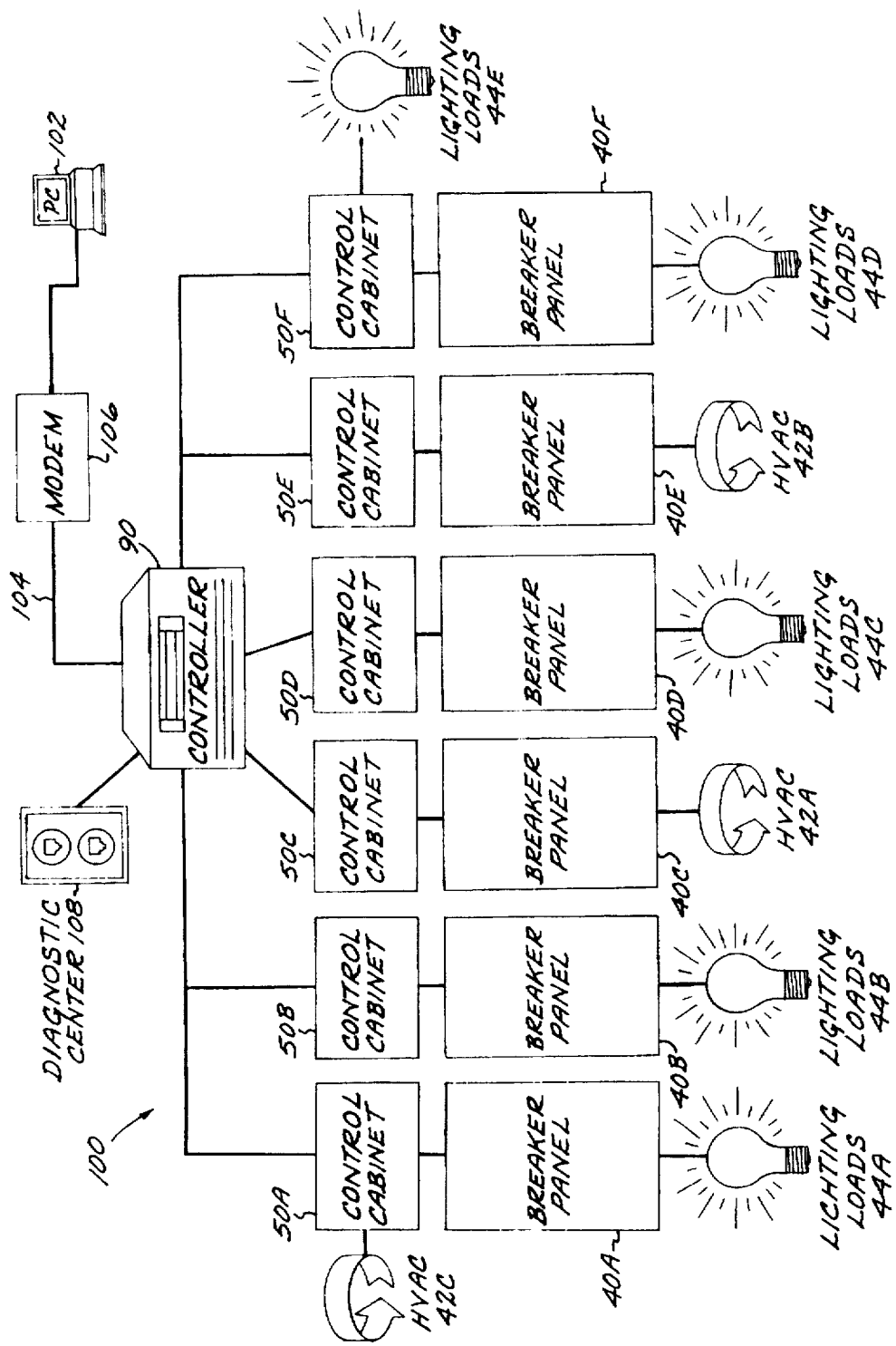
FIG. 3 is a simplified block diagram of an energy management system in accordance with the invention, employing a plurality of control cabinets.

FIG. 3 is a schematic block diagram of an energy management system 100 employing a plurality of control cabinets 50 in accordance with the invention. The low voltage controller 90 receives commands from personal computer 102 via modem 106 and telephone line connection 104. These commands can be scheduling programs and the like, for controlling the operation of the various loads 42, 44. A diagnostic center 108 is connected to the controller 90 for diagnostic tasks. The controller 90 controls a plurality of the control cabinets 50A–50F. Each control cabinet is connected to a corresponding circuit breaker panel 40A–40F. Various HVAC and lighting loads 42A–42C and 44A–44E are controlled through the cabinets 50A–50F.

The control cabinet 50 can be employed to provide energy management functions of existing circuits, or alternatively, new circuits can be added under control of the control cabinet. This is illustrated in FIG. 3, by the direct connection of loads 42C and 44E to cabinets 50A and 50F, respectively. The loads 42C and 44E indicate new circuits which are connected to the line voltage relays of the control cabinets, without a connection directly to the circuit breaker panels. Loads 44A, 44B, and 42A and 42B, on the other hand, are shown with a connection into corresponding circuit breaker panels. These loads represent circuits already in place prior to installation of the control cabinets 50A–50F. The control cabinets are subsequently wired up to the corresponding circuit breaker panels, where the connections of the loads to the breakers are disconnected, and the line voltage relays of the control cabinet are connected by wires between the breakers and loads.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A control cabinet for interfacing a circuit breaker panel to one or more line voltage loads under control of a low voltage controller, comprising:

a cabinet housing;

a plurality of line voltage relay circuits secured within the housing, each for selectively electrically connecting a circuit breaker in the circuit breaker panel to a corresponding line voltage load, each line voltage relay circuit including a line voltage relay actuator and a line voltage relay switch selectively opened/closed by the actuator, said line voltage relay switch connected in series connection between said circuit breaker and said corresponding line voltage load;

a line voltage bus and a neutral bus, said line voltage bus and said neutral bus connected to an external supply of line voltage, wherein said line voltage bus and said neutral bus do not supply line voltage power to said line voltage loads;

a plurality of low voltage relays secured within the housing, each low voltage relay comprising a low voltage relay actuator and a low voltage relay switch selectively opened/closed by said low voltage relay actuator, each low voltage actuator connected between a low voltage common bus and a low voltage command signal terminal, each low voltage relay switch connected in series with a corresponding line voltage actuator and said line voltage bus and said neutral bus, wherein closure of said low voltage switch results in application of line voltage to said corresponding line voltage actuator to actuate the corresponding line voltage switch, wherein application of a low voltage command signal to said low voltage command signal terminal by the low voltage controller actuates said low voltage relay actuator, operating said corresponding low voltage relay switch, which in turn actuates said line voltage relay actuator, operating said corresponding line voltage relay switch to selectively connect/ disconnect a corresponding circuit breaker to/from its corresponding line voltage load;

and wherein the control cabinet is free of any voltage transformers for transforming between line voltage and low voltage, so that all low voltage power required to operate said low voltage relays is supplied from outside the control cabinet.

2. The control cabinet of claim 1 wherein said low voltage command signals from the low voltage controller are low voltage alternating current command signals.

3. The control cabinet of claim 1, further comprising a plurality of indicator lights disposed within said control cabinet and wired between a low voltage common bus and a corresponding low voltage command signal terminal to visually indicate the status of the command signal.

4. The control cabinet of claim 1 wherein said external supply of line voltage is electrically isolated from said circuit breaker panel.

5. The control cabinet of claim 4 wherein one of said line voltage relay switches includes a first switch terminal connected to the line voltage bus, and a second switch terminal for connection to a corresponding one of the line voltage loads.

6. The control cabinet of claim 1 wherein one of said low voltage relays controls actuation of two or more of said line voltage relays.

7. A building energy management system for controlling application of line voltage to building line voltage loads, comprising:

a circuit breaker panel connected to a source of line voltage and comprising a plurality of circuit breakers;

a low voltage controller for providing a plurality of independent low voltage command signals;

a control cabinet external to said circuit breaker panel and said low voltage controller, said control cabinet comprising
a cabinet housing;
a plurality of line voltage relay circuits secured within the housing, each for selectively electrically connecting a circuit breaker in the circuit breaker panel to a corresponding line voltage load, each line voltage relay circuit including a line voltage relay actuator and a line voltage relay switch selectively opened/ closed by the actuator, said line voltage relay switch connected in series connection between said circuit breaker and said corresponding line voltage load;
a line voltage bus and a neutral bus, said line voltage bus and said neutral bus connected to an external supply of line voltage;
a plurality of low voltage relays secured within the housing, each low voltage relay comprising a low voltage relay actuator and a low voltage relay switch selectively opened/closed by said low voltage relay actuator, each low voltage actuator connected between a low voltage common bus and a low voltage command signal terminal, each low voltage relay switch connected in series with a corresponding line voltage actuator and said line voltage bus and said neutral bus, wherein closure of said low voltage switch results in application of line voltage to said corresponding line voltage actuator to actuate the corresponding line voltage switch, wherein application of a low voltage command signal to said low voltage command signal terminal by the low voltage controller actuates said low voltage relay actuator to selectively connect/disconnect a corresponding circuit breaker to/from its corresponding line voltage load;
and wherein the control cabinet is free of any voltage transformers for transforming between line voltage and low voltage, so that all low voltage power required to operate said low voltage relays is supplied from outside the control cabinet.

8. The system of claim 7 wherein said low voltage command signals from the low voltage controller are low voltage alternating current command signals.

9. The system of claim 7, further comprising a plurality of indicator lights disposed within said control cabinet and wired between a low voltage common bus and a corresponding low voltage command signal terminal to visually indicate the status of the command signal.

10. The system of claim 7 wherein said external supply of line voltage being isolated from said circuit breaker panel.

11. The system of claim 10 wherein one of said line voltage relay switches includes a first switch terminal connected to the line voltage bus, and a second switch terminal for connection to a corresponding one of the line voltage loads.

12. The system of claim 7 wherein one of said low voltage relays controls actuation of two or more of said line voltage relays.

* * * * *